United States Patent Office 3,440,008
Patented Apr. 22, 1969

3,440,008
METHOD OF PREPARING BASIC ALUMINUM SULPHATE
Giovanni Bonelli, Piazza Cavour 7, Milan, Italy
No Drawing. Filed Dec. 10, 1962, Ser. No. 243,586
Claims priority, application Italy, Dec. 9, 1961,
18,605/61
The portion of the term of the patent subsequent
to Oct. 22, 1984, has been disclaimed
Int. Cl. C01f 7/74; C01d 7/02
U.S. Cl. 23—123                                7 Claims The present invention concerns a process for separating the potassium and aluminum contained in potash alum by their formation into two distinct and separable compounds.

An object of the invention consists in so separating from potash alum the components potassium and aluminum that basic aluminum sulphate and potassium sulphate are obtained in a particularly pure condition.

It is another object of this invention to obtain a more efficient large-scale industrial utilization of potash alum (easily obtained from profusely available native minerals such as leucite, alunite and the like).

Basically, the method consists in that the aluminum sulphate contained in the alum is rendered insoluble through transformation into basic aluminum sulphate by means of reaction of the alum with aluminum hydrate. The latter, in turn, is obtained by known methods from the basic aluminum sulphate produced as a result of the operation itself. A simple and clear separation of the potassium sulphate and the aluminum sulphate is thus achieved without recourse to substances which would introduce ions other than those inherent to the alum and water and thereby cause difficulties in the separation of the final products. Furthermore, according to the invention, the possibility of obtaining aluminum hydrate directly and immediately from the basic aluminum sulphate the moment the latter is produced represents a simple and economical solution to the problem of the availability of an aluminum hydrate of a type most suitable for carrying out the precipitation reaction, this reaction being highly influenced by the physical state of the hydrate. Accordingly, part of the basic aluminum sulphate, produced from the aluminum hydrate acting as precipitant in the reaction with alum, is converted to aluminum hydrate which is again introduced into reaction with the alum.

Another important aspect of the invention, likewise instrument in lowering the cost of operation, is the recycling of the potassium sulphate solution obtained by the alum-aluminum hydrate reaction. This recycling is undertaken mainly to increase the potassium sulphate content, which reduces the quantity of water that must evaporate in order to ultimately obtain the crystallized sulphate.

Moreover, this recycling of the potassium sulphate increases the overall yield of the process, and results in recovering that part of the neutral aluminum that is not involved in the precipitation reaction with the aluminum hydrate and which, if it would remain in the potassium sulphate solution, would otherwise inevitably be lost, as it would mix with the final potassium sulphate.

In practice, the process starts out with potash alum, generally considered pure, which, as previously stated, is to be obtained by known methods from profusely available native minerals. The alum is dissolved in water (and/or the potassium sulphate solution recycled in from the last phase of the process itself for the purpose of increasing its potassium sulphate content, as mentioned before, prior to the crystallization of the potassium sulphate).

This alum solution is reacted at an optimum temperature of between 50° and 80° C. Under these conditions it is possible to recycle potassium sulphate solutions repeatedly, at least four or five times.

The potash alum solution thus obtained has a pH value of approx. 3.2. Freshly prepared aluminum hydrate, obtained from one half to two thirds of the total basic aluminum sulphate produced, is then added to the solution.

The ratio of the aluminum contained in the dissolved alum to that contained in the aluminum hydrate added to produce the reaction should be kept within the range of 1:1 to 1:2 in order to achieve the best possible conditions or the forming of basic aluminum sulphate, which is easily separated, and which produces an optimum yield. This ratio, in fact, insures that the aluminum hydrate, soluble in the original aqueous alum solution, will cause precipitation of a definitely insoluble basic aluminum sulphate at a pH value of about 4. In an initial operation, precipitation was completed in a pH range of from 4 to 6 by adding a small quantity of potassium hydrate in order to avoid introducing ions other than those of the alum and water. By following this method, the yield reached 96% calculated on the basis of the alumina ($Al_2O_3$), with no appreciable amount of neutral soluble aluminum sulphate remaining in the final potassium sulphate solution.

In subsequent operations, for economic reasons (the unit cost of potassium is higher in the hydrate than in the sulphate) the addition of potassium hydrate was omitted entirely and replaced with that of aluminum hydrate, in a larger amount, bringing the ratio to 1:2. Under these conditions, the final pH values range from 3.8 to 4. Furthermore, obviously, the amount of basic aluminum sulphate converted to aluminum hydrate, required to achieve the precipitation, will be greater than half, and may be as great as two-thirds of the quantity of basic aluminum sulphate. Precipitation in the above-mentioned pH range of from 3.8 to 4 offers the further advantage of achieving a basic aluminum sulphate practically free of iron, even in the case of an original alum obtained from minerals originating in ferruginous matrices and not perfectly purified, since under the conditions described the iron does not precipitate. This implies an important saving, as it avoids the considerable expense of pre-purifying the alum of its iron content. By proceeding as described, maintaining a ratio of aluminum in the alum to aluminum in the aluminum hydrate different from 1:1 and closer to 1:2, reaction time is lowered, and the yield is considerably increased.

However, it may be advantageous in certain cases to work with the 1:1 ratio; if so, it was found convenient to vary the previously described procedure (always omitting to add potassium hydrate), in order to solve the problem arising from the fact that, in the presence of the afore-mentioned precipitation ratio of 1:1, part of the aluminum sulphate escapes precipitation in the form of basic sulphate, due to insufficient precipitating aluminum hydrate, and accumulates, in the form of soluble neutral aluminum sulphate, in the final potassium sulphate solution greatly diminishing the yield. It has been observed that this neutral soluble sulphate can be recovered by the addition of aluminum hydrate to the potassium sulphate solution, which, after several recycles, has almost reached the saturation concentration required for crystallization of the potassium sulphate. The quantity of added aluminum hydrate is in such a proportion as will transform the neutral soluble aluminum sulphate to basic insoluble aluminum sulphate which is easily separated and can be added to the total yield of basic aluminum sulphate obtained. If this variant is adopted, the final pH value at precipitation is between 4 and 4.2 so that any ferrous impurities present in the alum remain, for the most part, in solution, and the products obtained from the basic aluminum sulphate will contain at most slight traces of iron.

Finally, if one should wish to obtain a basic aluminum sulphate practically free of potassium sulphate, the procedure is as follows: the basic aluminum sulphate is suspended in water at 50° C. acidulated with sulphuric acid, at a pH of 2.8 to 3. This suspension is agitated for an hour and is then filtered or washed thoroughly in cold water. The slight loss caused by washing is amply compensated for by the purity of basic aluminum sulphate thus obtained.

Upon analysis of the products, the basic aluminum sulphate obtained by the reaction of the aluminum hydrate with the alum solution should be defined by the formula $Al_2(SO_4)_3 \cdot 2Al(OH)_3$. However, this is not intended to be a limitation.

To exemplify the process, two series of examples are set forth herebelow. The first of these series is based on the case of a 1:2 ratio of aluminum in the alum to that in the aluminum hydrate. As will be seen, after four recycles (or five passes), a final yield of 97.32% is achieved, whereas when working with a 1:1 ratio, recovery is made after five useful operations, and the total yield, which in the single recycling prior recovery is fairly small, amounts to as much as 98.84%.

VARIANT 1

Example 1

50 kg. of potash alum (of which 8.52 kg. are $K_2SO_4$ and 5 kg. are $Al_2O_3$) are dissolved in 250 kg. of water at a temperature of about 80° C. To this solution, which has a pH value of about 3.20, 38.22 kg. of aluminum hydrate (of which 10 kg. are $Al_2O_3$) are added, while the solution is constantly stirred. The temperature is held constant during the two hour duration of the operation. The pH value at this time being about 3.80. A precipitate of 52.83 kg. of basic aluminum sulphate (of which 14.87 kg. are $Al_2O_3$) is obtained. This precipitate is removed by filtration and a solution is obtained which is 3.02% by weight of potassium sulphate (of which 8.52 kg. are potassium sulphate, 273.45 kg. are water, and 0.43 kg. are soluble neutral aluminum sulphate containing 0.13 kg. of $Al_2O_3$). The precipitation yield is 97.40% basic aluminum sulphate; 35.52 kg. of this product (of which 10 kg. are $Al_2O_3$) are destined for the production of aluminum hydrate, which is used in starting the precipitation reaction.

Example 2

50 kg. of alum (of which 8.52 kg. are $K_2SO_4$ and 5 kg. are $Al_2O_3$) are dissolved in the solution of potassium sulphate obtained from the operation disclosed in Example 1. This solution of potassium sulphate kept at a temperature of 80° C. contained 8.52 kg. of potassium sulphate and 273.45 kg. of water. The new solution obtained will have a pH value of 3.20. While this solution is being agitated, 35.09 kg. of aluminum hydrate (of which 10 kg. are $Al_2O_3$) are added. The agitation is continued for two hours at a temperature of 80° C., the pH value at this time being about 3.90.

52.17 kg. of basic aluminum sulphate (of which 14.90 kg. are $Al_2O_3$) are then filtered and removed. The solution, which is 5.63% potassium sulphate (of which 17.04 kg. are potassium sulphate, 285.15 kg. are water, and 0.76 kg. are neutral soluble aluminum sulphate containing 0.023 kg. of $Al_2O_3$), is sent to the following recycle. 35.01 kg. of the basic aluminum sulphate (of which 10 kg. are $Al_2O_3$) are to be used in the recycle for starting the precipitation reaction. The precipitation yield is 98.00%.

Example 3

50 kg. of alum (of which 8.52 kg. are $K_2SO_4$ and 5 kg. are $Al_2O_3$) are dissolved in a solution of recycled potassium sulphate containing 17.04 kg. of potassium sulphate and 285.51 kg. of water and having a pH value of 3.20. To this solution are added 39.34 kg. of aluminum hydrate (of which 10 kg. are $Al_2O_3$). This solution is agitated for two hours at a temperature of 80° C., the pH value at this time being about 4.

53.38 kg. of basic aluminum sulphate (of which 14.80 kg. are $Al_2O_3$) are then filtered and removed. The solution, which is 7.86% potassium sulphate (of which 25.56 kg. are potassium sulphate, 299.28 kg. are water, and 1.42 kg. are neutral soluble aluminum sulphate containing 0.43 kg. $Al_2O_3$) is sent to the following recycle, 36.06 kg. of the basic aluminum sulphate (of which 10 kg. are $Al_2O_3$) are to be used in the recycle for starting the precipitation reaction. The precipitation yield is 96.00%.

Example 4

50 kg. of alum (of which 8.52 kg. are $K_2SO_4$ and 5 kg. are $Al_2O_3$) are dissolved in a solution of recycled potassium sulphate containing 25.56 kg. of potassium sulphate and 299.28 kg. of water and having a pH value of 3.20. To this solution are added 35.39 kg. of aluminum hydrate (of which 10 kg. are $Al_2O_3$). This solution is agitated for two hours at a temperature of 80° C., the pH value at this time being about 3.90.

55.42 kg. of basic aluminum sulphate (of which 14.87 kg. are $Al_2O_3$) are then filtered and removed. The solution, which is 9.65% potassium sulphate (of which 34.08 kg. are potassium sulphate, 318.70 kg. are water, and 1.85 kg. are neutral soluble aluminum sulphate containing 0.56 kg. $Al_2O_3$), is sent to the following recycle. 37.26 kg. of the basic aluminum sulphate (of which 10 kg. are $Al_2O_3$) are to be used in the recycle for starting the precipitation reaction. The precipitation yield is 97.40%.

Example 5

50 kg. of alum (of which 8.52 kg. are $K_2SO_4$ and 5 kg. are $Al_2O_3$) are dissolved in the recycled potassium sulphate solution coming from the fourth operation and containing 34.08 kg. of $K_2SO_4$ and 318.70 kg. of water. The temperature of the solution is 80° C. and the pH value is 3.20. To this solution are added 42.09 kg. of aluminum hydrate (of which 10 kg. are $Al_2O_3$). This solution is agitated for two hours at a temperature of 80° C., the pH value at this time being about 4.

56.68 kg. of basic aluminum sulphate (of which 14.89 kg. are $Al_2O_3$) are then filtered and removed. The solution, which is 10.94% by weight of potassium sulphate (of which 42.60 kg. are potassium sulphate and 2.21 kg. are neutral soluble aluminum sulphate containing 0.67 kg. of $Al_2O_3$), can no longer be recycled in an inexpensive manner. The solution (which by now contains 346.72 kg. of water) must be concentrated and the potassium sulphate crystallized. 38.06 kg. of the basic aluminum sulphate (of which 10 kg. are $Al_2O_3$) are to be used in the recycle for starting the precipitation reaction. The precipitation yield in 97.80%.

VARIANT 2

Example 6

50 kg. of alum (of which 8.52 kg. are $K_2SO_4$ and 5 kg. are $Al_2O_3$) are dissolved in 250 kg. of water at a temperature of about 80° C. To this solution, which has a pH value of about 3.30, 19.64 kg. of aluminum hydrate (of which 5 kg. are $Al_2O_3$) are added, while the solution is constantly stirred. The temperature is held constant during the four hour duration of the operation, the pH value at this time being about 4.10. A precipitate of 31.50 kg. of basic aluminum sulphate (of which 9.20 kg. are $Al_2O_3$) is obtained. This precipitate is removed by filtration and a solution is obtained which is 3.30% by weight of potassium sulphate (of which 8.52 kg. are potassium sulphate and 2.68 kg. are soluble neutral aluminum sulphate containing 0.80 kg. of $Al_2O_3$). 17.10 kg. of the product of aluminum sulphate (of which 5 kg. are $Al_2O_3$) are destined for the production of aluminum hydrate, which is used in starting the precipitation reaction. The precipitation yield is 84.00%.

Example 7

50 kg. of alum (of which 8.52 kg. are $K_2SO_4$ and 5 kg. are $Al_2O_3$) are dissolved in the solution of potassium sulphate obtained from the operation disclosed in Example 6. This solution of potassium sulphate, kept at a temperature of 80° C., contained 8.52 kg. of potassium sulphate and 248.96 kg. of water. The new solution obtained will have a pH value of 3.20. While this solution is being agitated, 19.04 kg. of aluminum hydrate (of which 5 kg. are $Al_2O_3$) are added. The agitation is continued for four hours at a temperature of 80° C., the pH value at this time being about 4.20.

32.15 kg. of basic aluminum sulphate (of which 9.30 kg. are $Al_2O_3$) are then filtered and removed. The solution, which is 6.22% by weight of potassium sulphate (of which 17.04 kg. are potassium sulphate, 256.78 kg. are water, and 5.03 kg. are neutral soluble aluminum sulphate containing 1.50 kg. $Al_2O_3$), is recycled. 17.28 kg. of the basic aluminum sulphate (of which 5 kg. are $Al_2O_3$) are used in the preparation of aluminum hydrate, which is used in the recycle for starting the precipitation reaction. The precipitation yield is 86.00%.

Example 8

50 kg. of alum (of which 8.52 kg. are $K_2SO_4$ and 5 kg. are $Al_2O_3$) are dissolved in the solution of potassium sulphate obtained from the operation disclosed in Example 7. This solution of potassium sulphate, kept at a temperature of 80° C., contained 17.04 kg. of potassium sulphate and 256.78 kg. of water. 50 kg. of water is added to replace that which evaporated. The new solution will have a pH value of 3.20. While this solution is being agitated, 20.72 kg. of aluminum hydrate (of which 5 kg. are $Al_2O_3$) are added. The agitation is continued for four hours at a temperature of 80° C., the pH value at this time being about 4.10.

31.19 kg. of basic aluminum sulphate (of which 9.25 kg. are $Al_2O_3$) are then filtered and removed. The solution, which is 7.41% by weight of potassium sulphate (of which 25.56 kg. are potassium sulphate, 319.28 kg. are water, and 7.54 kg. are neutral soluble aluminum sulphate containing 2.25 kg. $Al_2O_3$), is recycled. 16.85 kg. of the basic aluminum sulphate (of which 5 kg. are $Al_2O_3$) are used in the preparation of aluminum hydrate, which is used in the recycle for starting the precipitation reaction. The precipitation yield is 85.00%.

Example 9

50 kg. of alum (of which 8.52 kg. are $K_2SO_4$ and 5 kg. are $Al_2O_3$) are dissolved in the solution of potassium sulphate obtained from the operation disclosed in Example 8. This solution of potassium sulphate, kept at a temperature of 80° C., contained 25.56 kg. of potassium sulphate and 319.28 kg. of water. 50 kg. of water is added to replace that which evaporated. The new solution will have a pH value of 3.20. While this solution is being agitated, 21.84 kg. of aluminum hydrate (of which 5 kg. are $Al_2O_3$) are added. The agitation is continued for four hours at a temperature of 80° C., the pH value at this time being about 4.10.

30.89 kg. of basic aluminum sulphate (of which 9.40 kg. are $Al_2O_3$) are then filtered and removed. The solution, which is 8.23% by weight of potassium sulphate (of which 34.08 kg. are potassium sulphate, 379.52 kg. are water, and 9.55 kg. are neutral soluble aluminum sulphate containing 2.85 kg. $Al_2O_3$), is recycled. 16.43 kg. of the basic aluminum sulphate (of which 5 kg. are $Al_2O_3$) are used in the preparation of aluminum hydrate, which is used in the recycle for starting the precipitation reaction. The precipitation yield is 88.00%.

Example 10

50 kg. of alum (of which 8.52 kg. are $K_2SO_4$ and 5 kg. are $Al_2O_3$) are dissolved in the solution of potassium sulphate obtained from the operation disclosed in Example 9. This solution of potassium sulphate, kept at at temperature of 80° C., contained 34.08 kg. of potassium sulphate and 379.52 kg. of water. 50 kg. of water is added to replace that which evaporated. The new solution will have a pH value of 3.20. While this solution is being agitated, 20.54 kg. of aluminum hydrate (of which 5 kg. are $Al_2O_3$) are added. The agitation is continued for four hours at a temperature of 80° C., the pH value at this time being about 4.20.

30.72 kg. of basic aluminum sulphate (of which 9.20 kg. are $Al_2O_3$) are then filtered and removed. The solution, which is 9.77% by weight of potassium sulphate (of which 42.60 kg. are potassium sulphate, 393.14 kg. are water, and 12.18 kg. are neutral soluble aluminum sulphate containing 3.65 kg. $Al_2O_3$), is recycled. 16.79 kg. of the basic aluminum sulphate (of which 5 kg. are $Al_2O_3$) are used in the preparation of aluminum hydrate, which is used in the recycle for starting the precipitation reaction. The precipitation yield is 84.00%.

At the end of this 5th operation the quantity of neutral aluminum sulphate remaining in solution is 12.18 kg. (of which 3.65 kg. are $Al_2O_3$), a remarkably high percentage. Thus, a recovering operation is required which will increase the yield inexpensively. To this end the following method is adopted.

Example 11

The final solution of potassium sulphate, kept at a temperature of 80° C., contains 42.60 kg. of potassium sulphate, 12.18 kg. of aluminum sulphate, and 393.14 kg. of water. While this solution is being agitated, 21.05 kg. of aluminum hydrate (of which 5 kg. are $Al_2O_3$) are added. The agitation is continued for four hours at a temperature of 80° C., the pH value at this time being about 4.10.

28.899 kg. of basic aluminum sulphate (of which 8.358 kg. are $Al_2O_3$) are then filtered and removed. The solution is 9.70% by weight of potassium sulphate (of which 42.60 kg. are potassium sulphate, 396.55 kg. are water, and 0.979 kg. are still aluminum sulphate containing 0.292 kg. of $Al_2O_3$). 17.26 kg. of the basic aluminum sulphate (of which 5 kg. are $Al_2O_3$) are used in the preparation of aluminum hydrate, which is used for starting the precipitation reaction. The precipitation yield is 92.00%.

It is, of course, to be understood that the present invention is, by no means, limited to the specific examples set forth above, but also comprises various modifications, the scope of the invention being defined by the claims.

What is claimed is:

1. A process of separating from potash alum the potassium and aluminum components thereof, which includes the steps of: dissolving the potash alum in water having a temperature range of from 50 to 80° C. to form a potassium aluminum sulphate solution, intermixing and reacting freshly precipitated aluminum hydrate with the said potassium aluminum sulphate solution, while maintaining the ratio of aluminum content in the alum to the aluminum content in the aluminum hydrate within the range of from 1:1 to 1:2 to form basic aluminum sulphate and a potassium sulphate solution. and by precipitation separating the basic aluminum sulphate from the thus obtained solution.

2. A process according to claim 1, which includes the step of employing from ½ to ⅔ of the total yield of basic aluminum sulphate for producing the aluminum hydrate required for reaction with the potash alum solution to obtain the insoluble basic aluminum sulphate and its precipitation from the alum solution.

3. A process according to claim 1, which includes the step of recycling to the preliminary phase of said process for a plurality of times the potassium sulphate solution obtained from the potash alum solution until the potassium sulphate solution is saturated to such an extent that potassium sulphate can be crystallized therefrom.

4. A process according to claim 1, in which the precipitation of the baseic aluminum sulphate is carried out at a final pH value of from 4.2 to 3.8 of the thus obtained solution.

5. A process according to claim 3, which includes the step of: after the last recycling step and prior to the crystallization of the potassium sulphate solution treating the concentrated solution containing the potassium sulphate and the soluble neutral aluminum sulphate that has escaped precipitation during the preceding single recycling steps with aluminum hydrate until total precipitation of the soluble aluminum sulphate takes place in the form of basic insoluble aluminum sulphate.

6. A process according to claim 1, which includes the step of subjecting the baseic aluminum sulphate to treatment in water acidulated with sulphuric acid with a pH value of from approximately 2.8–3 at a temperature of approximately 50° C., and subsequently filtering out the said basic aluminum sulphate and rinsing the same with cold water.

7. A process according to claim 1, in which the basic aluminum sulphate obtained corresponds to the formula $Al_2(SO_4)_3 2Al(OH)_3$.

References Cited

FOREIGN PATENTS 938  4/1855  Great Britain.

OTHER REFERENCES

Mellor: "A Comprehensive Treatise on Inorganic and Theoretical Chemistry," Longmans, Green & Co., New York, N.Y., vol. 5, 1924, pp. 336, 337 and 351.

OSCAR R. VERTIZ, *Primary Examiner.*

E. C. THOMAS, *Assistant Examiner.*

U.S. Cl. X.R.

23—121, 143